United States Patent
Lee et al.

(10) Patent No.: US 10,541,399 B2
(45) Date of Patent: Jan. 21, 2020

(54) SECONDARY BATTERY SEPARATOR COMPRISING ORGANIC/INORGANIC COMPOSITE POROUS LAYER, AND MANUFACTURING METHOD THEREFOR

(71) Applicant: LG Chem, Ltd., Seoul (KR)

(72) Inventors: Joo-Sung Lee, Daejeon (KR); Ji-Eun Kim, Daejeon (KR); In-Gyoung Yu, Daejeon (KR); Sun-Mi Jin, Daejeon (KR); Da-Kyung Han, Daejeon (KR)

(73) Assignee: LG Chem, Ltd. (KR)

( * ) Notice: Subject to any disclaimer, the term of this patent is extended or adjusted under 35 U.S.C. 154(b) by 46 days.

(21) Appl. No.: 15/520,281

(22) PCT Filed: Oct. 26, 2015

(86) PCT No.: PCT/KR2015/011330
§ 371 (c)(1),
(2) Date: Apr. 19, 2017

(87) PCT Pub. No.: WO2016/064256
PCT Pub. Date: Apr. 28, 2016

(65) Prior Publication Data
US 2017/0331094 A1    Nov. 16, 2017

(30) Foreign Application Priority Data
Oct. 24, 2014    (KR) .................. 10-2014-0145532

(51) Int. Cl.
*H01M 2/16*    (2006.01)
*H01M 2/18*    (2006.01)
(Continued)

(52) U.S. Cl.
CPC .......... *H01M 2/1633* (2013.01); *H01M 2/18* (2013.01); *H01M 10/0525* (2013.01); *C08F 2/22* (2013.01); *C08F 10/00* (2013.01)

(58) Field of Classification Search
CPC ........ H01M 2/1633; H01M 2/14; H01M 2/18; H01M 2/16; H01M 10/0525; C08F 2/22; C08F 10/00
See application file for complete search history.

(56) References Cited

U.S. PATENT DOCUMENTS 9,786,888 B2    10/2017  Teshima et al.
2007/0264577 A1    11/2007  Katayama et al.
(Continued)

FOREIGN PATENT DOCUMENTS

JP    2006164761 A    6/2006
JP    2011165660 A    8/2011
(Continued)

OTHER PUBLICATIONS

National Center for Biotechnology Information. PubChem Compound Database; CID=23706213, https://pubchem.ncbi.nlm.nih.gov/compound/23706213 (accessed Dec. 12, 2018). (Year: 2018).*
(Continued)

*Primary Examiner* — Edu E. Enin-Okut
(74) *Attorney, Agent, or Firm* — Lerner, David, Littenberg, Krumholz & Mentlik, LLP (57) ABSTRACT

The present invention relates to a secondary battery separator, and a manufacturing method therefor. The secondary battery separator according to the present invention comprises an organic/inorganic composite porous layer for improving thermal resistance and physical strength, and since the organic/inorganic composite porous layer uses polymer particles as a binder, the secondary battery separator, compared with a separator using a solvent-type binder resin using organic solvents, exhibits excellent permeability.

9 Claims, 5 Drawing Sheets

(51) Int. Cl.
*H01M 10/0525* (2010.01)
*C08F 2/22* (2006.01)
*C08F 10/00* (2006.01)

(56) References Cited

U.S. PATENT DOCUMENTS

| | | | |
|---|---|---|---|
| 2009/0111025 A1 | 4/2009 | Lee et al. | |
| 2009/0111026 A1* | 4/2009 | Kim | H01M 2/145 429/252 |
| 2011/0027658 A1 | 2/2011 | Kim et al. | |
| 2012/0088155 A1* | 4/2012 | Yushin | H01M 2/16 429/217 |
| 2014/0370358 A1 | 12/2014 | Hong et al. | |
| 2015/0140402 A1* | 5/2015 | Kim | H01M 2/162 429/144 |
| 2015/0140404 A1* | 5/2015 | Yoo | H01M 2/1653 429/145 |
| 2015/0303427 A1* | 10/2015 | Hyun | H01M 2/145 429/145 |

FOREIGN PATENT DOCUMENTS

| | | |
|---|---|---|
| JP | 2013022876 A | 2/2013 |
| KR | 100727248 B1 | 6/2007 |
| KR | 100775310 B1 | 11/2007 |
| KR | 20080106881 A | 12/2008 |
| KR | 101125013 B1 | 3/2012 |
| KR | 20130066746 A | 6/2013 |
| KR | 101341196 B1 * | 12/2013 ......... H01M 2/1653 |
| KR | 101341196 B1 | 12/2013 |
| WO | 2007061269 A1 | 5/2007 |
| WO | 2013080867 A1 | 6/2013 |
| WO | 2014136799 A1 | 9/2014 |

OTHER PUBLICATIONS

Zhivkov, Alexandar M. "Electric Properties of Carboxymethyl Cellulose". Cellulose—Fundamental Aspects. Ed. Theo G.M. Van De Ven. InTechOpen, 2013. InTech.com Web. Accessed on Dec. 12, 2018. <https://www.intechopen.com/books/cellulose-fundamental-aspects/electric-properties-of-carboxymethyl-cellulose> (Year: 2013).*
Extended European Search Report for Application EP15853216 dated Feb. 2, 2018.
International Search Report from PCT/KR2015/011330, dated Jan. 26, 2016.

* cited by examiner

SECONDARY BATTERY SEPARATOR COMPRISING ORGANIC/INORGANIC COMPOSITE POROUS LAYER, AND MANUFACTURING METHOD THEREFOR

CROSS-REFERENCE TO RELATED APPLICATIONS

The present application is a national phase entry under 35 U.S.C. § 371 of International Application No. PCT/KR2015/011330, filed Oct. 26, 2015, published in Korean, which claims priority from Korean Patent Application No. 10-2014-0145532 filed Oct. 24, 2014, the disclosures of which are hereby incorporated herein by reference.

TECHNICAL FIELD

The present disclosure relates to a separator used in an electrochemical device such as a secondary battery and a method for manufacturing the same. More particularly, the present disclosure relates to a porous separator having an organic/inorganic composite porous layer with improved air permeability characteristics and a method for manufacturing the same.

BACKGROUND ART

A secondary battery is an energy storage that is basically made up of positive electrode/negative electrode/separator/electrolyte solution and can be recharged by reversible conversion between chemical energy and electrical energy, ensuring high energy density. The application of secondary batteries is rapidly expanding to small electronic devices including mobile phones and laptop computers, and even hybrid electric vehicles (HEV) and energy storage system (ESS).

A secondary battery is an electrochemical device that is insulated by a separator and thus is stable, but there is a risk of heat generation and explosion in the even that a short circuit occurs between a positive electrode and a negative electrode due to internal or external battery failure or impacts, so the most important consideration is to ensure thermal/chemical safety of the separator as an insulator.

However, a separator made of polymer including polyolefin has high thermal shrinkage at high temperature and a risk of failure caused by dendrite growth. To solve the problem, disclosed is a coated separator in which one surface or two surfaces of a porous separator substrate are coated with inorganic particles along with a binder to protect the separator from a risk of failure and prevent thermal contraction.

Figure 2:
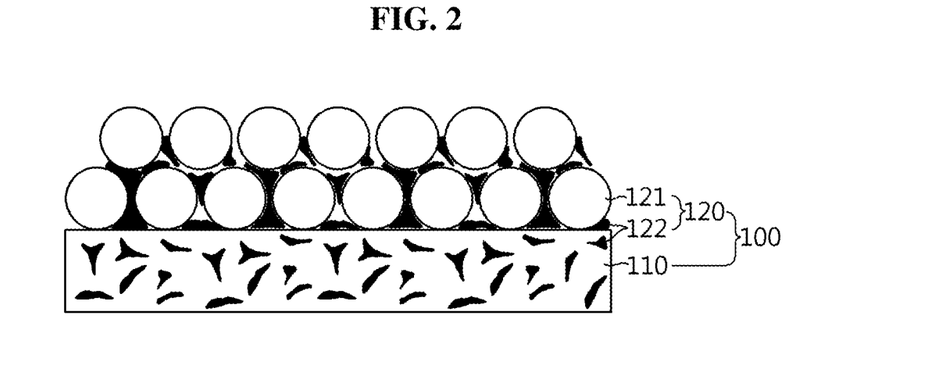
FIG. 2 shows diagrammatically and schematically the cross section of a separator having an organic/inorganic composite porous layer according to prior art.

Regarding the coated separator, according to Korean Patent No. 10-0775310, a polymer resin binder and inorganic particles are added to an organic solvent to prepare an organic/inorganic slurry (PVDF-CTFE/$BaTiO_3$ or PVDF-CTFE/$Al_2O_3$) and the organic/inorganic slurry is coated on a porous substrate to manufacture a separator having an organic/inorganic composite porous layer. In this process, a binder solution containing binder resin such as PVDF-CTFE dissolved in a solvent is used to provide good adhesion between powdery inorganic particles. In this case, however, because the binder solution is apt to penetrate into the pores of the porous substrate, a large amount of binders need to be used to show sufficient adhesion between the inorganic material and the porous substrate surface, resulting in battery performance degradation. FIG. 2 shows a separator having a composite porous layer according to prior art, and as in the illustrated example, the binder resin dissolved in the organic solvent penetrates into the pores of the porous substrate and blocks the pores of the porous substrate. Moreover, as the binder concentration in the slurry increases, the slurry viscosity greatly increases, making it difficult to form a thin-film organic/inorganic composite layer and high temperature is required in the drying process, and when the slurry viscosity is maintained at low level, adhesion with the porous substrate or adhesion between the inorganic material is lowered, causing the inorganic particles to easily detach.

As the organic solvent-based process involves a long dry zone of a dry line during drying due to the critical explosion limit, the slurry changes in concentration and rheological properties by solvent evaporation in the slurry preparation and transfer and coating processes, which may affect the coating quality of final products.

Furthermore, to increase adhesion between the porous substrate and the organic/inorganic composite porous layer, Korean Patent No. 10-1125013 discloses a method for manufacturing a cross-linked ceramic-coated separator using ionic polymer that dissolves in water. This method also uses ionic polymer that is soluble in water, but not disperse and completely dissolves it in water, inevitably encountering a phenomenon in which the solvent is trapped, and a larger amount of organic solvent such as diethylacetamide solvent is used 15 times than water, failing to provide a technical motivation to a coating method using an aqueous solvent, and besides, it is necessary to add crosslinker and initiator together to an organic solvent in the slurry preparation process to induce chemical crosslinking after coating for the benefit of increased adhesion with the substrate, and heat or UV treatment for 20 hours or longer is absolutely required in the drying process. However, when crosslinker and initiator are added to the slurry solution, partial self-crosslinking takes place by heat and energy applied from the outside environment in the process of storage and transfer of the coating solution before applied to the porous substrate, promoting solidification of the slurry, eventually resulting in reduced uniformity of the coated separator. Furthermore, because long-time heat treatment and UV treatment is necessary during drying, the output of the manufacturing process is limited, and the thin-film porous substrate may be damaged by high temperature/high energy during drying, causing property degradation and air permeability reduction.

DISCLOSURE

Technical Problem

The present disclosure is designed to solve the conventional problems as described above, and therefore, the present disclosure is directed to providing a separator for a secondary battery with superior air permeability and a method for manufacturing the same. The present disclosure is further directed to providing a manufacturing method whereby intrinsic properties of a separator such as air permeability can be easily controlled by controlling the content of binder and/or thickener. These and other objects and advantages of the present disclosure will be apparent from the following detailed description. Furthermore, it will be easily understood that the objects and advantages of the present disclosure may be realized by the means or method set forth in the appended claims and combinations thereof.

Technical Solution

To solve the problem, the present disclosure provides a porous separator for a secondary battery including binder polymer particles.

According to a first aspect of the present disclosure, the porous separator includes a polymer porous substrate having pores, and an organic/inorganic composite porous layer formed on at least one surface of the polymer porous substrate. Here, the organic/inorganic composite porous layer includes inorganic particles, binder polymer particles, and an adsorbent polymer binder, and the inorganic particles are coated with the adsorbent polymer binder on at least a portion of surface.

According to a second aspect of the present disclosure, in the first aspect, a maximum radius of gyration of the adsorbent polymer binder is $1/100$ or more and $1/4$ or less of a median diameter (D50) of the inorganic particles.

According to a third aspect of the present disclosure, in the second aspect, the maximum radius of gyration of the adsorbent polymer binder is 50 nm or less.

According to a fourth aspect of the present disclosure, in any one of the first to third aspects, the organic/inorganic composite porous layer is a packed structure of the inorganic particles and the binder polymer particles, and is a porous structure having pores formed by interstitial volume between the packed inorganic particles and/or binder polymer particles.

According to a fifth aspect of the present disclosure, in any one of the first to fourth aspects, an average particle size of the inorganic particles and the binder polymer particles is larger than a median diameter of the pores of the porous substrate.

According to a sixth aspect of the present disclosure, in any one of the first to fifth aspects, an average particle size of the inorganic particles and the binder polymer particles is a minimum of 20 nm.

According to a seventh aspect of the present disclosure, in any one of the first to sixth aspects, the binder polymer particles are formed by emulsion polymerization.

According to an eighth aspect of the present disclosure, in any one of the first to seventh aspects, the inorganic particles are not oxidized and/or reduced within an operating voltage range of the secondary battery.

According to a ninth aspect of the present disclosure, in the eighth aspect, the inorganic particles are inorganic particles having an ability to transport lithium ions and/or high dielectric constant inorganic particles having a dielectric constant of 5 or higher.

A tenth aspect of the present disclosure relates to a secondary battery. The secondary battery includes a negative electrode, a positive electrode, a separator interposed between the negative electrode and the positive electrode, and an electrolyte solution, and the separator includes a polymer porous substrate having pores, and an organic/inorganic composite porous layer formed on at least one surface of the polymer porous substrate, wherein the organic/inorganic composite porous layer includes inorganic particles and binder polymer particles, and the inorganic particles are coated with an adsorbent polymer binder on at least a portion of surface.

According to an eleventh aspect of the present disclosure, in the tenth aspect, a maximum radius of gyration of the adsorbent polymer binder is $1/100$ or more and $1/4$ or less of a median diameter (D50) of the inorganic particles.

According to a twelfth aspect of the present disclosure, in the eleventh aspect, the maximum radius of gyration of the adsorbent polymer binder is 50 nm or less.

According to a thirteenth aspect of the present disclosure, in any one of the tenth to twelfth aspects, the organic/inorganic composite porous layer has a packed structure of the inorganic particles and the binder polymer particles are, and has a porous structure having pores formed by interstitial volume between the packed inorganic particles and/or binder polymer particles.

According to a fourteenth aspect of the present disclosure, in any one of the tenth to thirteenth aspects, an average particle size of the inorganic particles and the binder polymer particles is larger than a median diameter of the pores of the porous substrate.

A fifteenth aspect of the present disclosure relates to a method for manufacturing a porous separator for a secondary battery. The manufacturing method includes (S10) preparing a polymer porous substrate having pores, (S20) putting and dissolving an adsorbent polymer binder in a solvent, (S30) adding inorganic particles to the result of (S20) and dispersing the same, (S40) putting binder polymer particles in the result of (S30) to prepare a slurry for forming an organic/inorganic composite porous layer, and (S50) applying the slurry of (S40) to the porous substrate prepared at (S10) and drying, wherein the organic/inorganic composite porous layer formed at (S50) includes inorganic particles and binder polymer particles, and is a packed structure of the inorganic particles and the binder polymer particles and is a porous structure having pores formed by interstitial volume between the packed inorganic particles and/or binder polymer particles.

According to a sixteenth aspect of the present disclosure, in the fifteenth aspect, an average particle size of the inorganic particles and the binder polymer particles is larger than a median diameter of the pores of the porous substrate.

Advantageous Effects

The separator for a secondary battery manufactured by the claimed method for manufacturing a separator has superior heat resistance and mechanical properties because the separator is less prone to the occurrence of surface defects during drying. Furthermore, the binder polymer particles in the organic/inorganic composite porous layer do not penetrate into the pores of the separator substrate, resulting in outstanding air permeability characteristics.

BRIEF DESCRIPTION OF THE DRAWINGS

The accompanying drawings illustrate a preferred embodiment of the present disclosure, and together with the detailed description, serves to provide clear explanations for the principle of the present disclosure, and thus, the scope of the present disclosure is not limited thereto. On the other hand, the shape, size, scale or ratio of the elements in the drawings as stated herein may be exaggerated for clarity.

MODE FOR CARRYING OUT THE INVENTION

It should be understood that the terms or words used in the specification and the appended claims should not be construed as being limited to general and dictionary meanings, but interpreted based on the meanings and concepts corresponding to technical aspects of the present disclosure on the basis of the principle that the inventor is allowed to define terms appropriately for the best explanation. The description provided herein and illustration shown in the drawings is just a most preferable example of the present disclosure, and does not represent all the technical features of the disclosure.

The present disclosure relates to a porous separator for a secondary battery, a secondary battery including the same, and a method for manufacturing the separator.

The porous separator for a secondary battery according to the present disclosure includes a) a porous substrate made of a polymer material; and b) an organic/inorganic composite porous layer which is formed on one surface or two surfaces of the porous substrate and includes a plurality of inorganic particles, an adsorbent polymer binder, and a plurality of binder polymer particles. In the present disclosure, at least a portion of the surface of the inorganic particles may be coated by the adsorbent polymer binder. The organic/inorganic composite porous layer improves the heat resistance and mechanical strength of the separator, and as the inorganic particles are held together by the particulate binder, air permeability is superior to that of a separator manufactured by using a solvent-type binder resin solution employing an organic solvent.

According to a particular embodiment of the present disclosure, the porous substrate is a film type porous membrane, and the porous substrate electrically isolates a negative electrode from a positive electrode to prevent a short circuit and can provide a movement channel of lithium ions, and any porous substrate that can be commonly used for a separator material of an electrochemical device is available. The porous substrate includes a film or a nonwoven fabric formed of a polymer compound such as high density polyethylene, low density polyethylene, linear low density polyethylene, ultra high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphtalene, respectively used singly or in combination.

The thickness of the porous substrate ranges from 1 μm to 100 μm, and preferably 1 μm~3 μm. Recently, with higher output/higher capacity of batteries, using a thin film is advantageous to the porous substrate. The porous substrate may have a pore diameter of 10 nm~100 nm, 10 nm~70 nm, 10 nm~50 nm, or 10 nm~35 nm, and a porosity of from 5% to 90%, preferably 20% to 80%. However, in the present disclosure, this numerical range may be easily modified according to a specific embodiment or the necessity.

Figure 4:
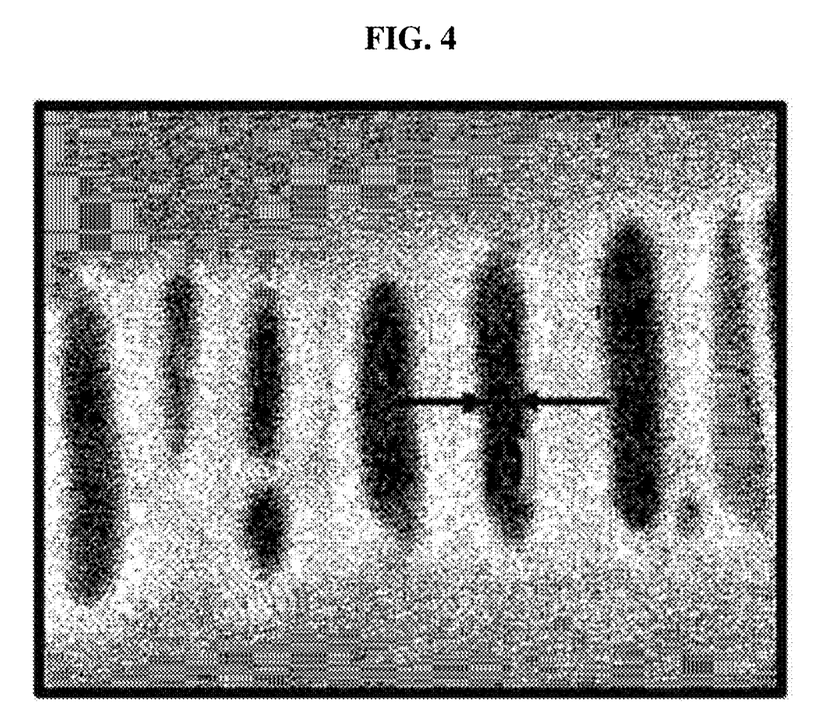
FIG. 4 illustrates a method of measuring the pore size of a uniaxially oriented porous separator of dry type.

The pores of the porous substrate have many types of pore structures, and if even any one of an average pore size measured using a porosimeter or an average pore size observed on FE-SEM satisfies the above condition, it will fall within the present disclosure. Here, in the case of generally known uniaxially oriented separators of dry type, the pore size in TD, not the pore size in MD, of the pores at the central area on FE-SEM [see FIG. 4] is used for calculation, and in the case of other porous substrates having a net structure (for example, PE separators of wet type), the pore size measured using a porosimeter is used for calculation.

The separator according to the present disclosure has the organic/inorganic composite porous layer formed on one surface or two surfaces of the porous substrate. In the present disclosure, the organic/inorganic composite porous layer includes inorganic particles and binder polymer particles. Furthermore, the inorganic particles may be surface-coated with the adsorbent polymer binder in part or in whole.

The thickness of the organic/inorganic composite porous layer is not particularly limited, but may be adjusted in consideration of the battery performance. In a particular embodiment of the present disclosure, the thickness ranges from 0.5 μm to 50 μm or from 1 μm to 10 μm. The thickness range of the porous layer may be adjusted according to the properties or use of the battery in order to improve the battery performance.

The organic/inorganic composite porous layer has a structure in which the inorganic particles and/or the binder polymer particles are packed closely together. Preferably, the inorganic particles and/or the binder polymer particles are uniformly dispersed and distributed in the composite porous layer. Furthermore, interstitial volume is formed between the inorganic particles and/or the binder polymer particles in the composite porous layer. The interstitial volume is a space defined between the particles packed closely together in the porous layer, and the composite porous layer has porous properties due to the pores formed by the interstitial volume.

According to a particular embodiment of the present disclosure, the pore size and the porosity of the organic/inorganic composite porous layer primarily relies on the size of the inorganic particles. For example, in case that inorganic particles having a particle size of 500 nm or less are used, pores formed are 500 nm or less in size. The pore structure is filled with an electrolyte solution that will be injected later, and the filled electrolyte solution transports ions. Thus, the pore size and the porosity is an important factor affecting adjustment of the ionic conductivity of the separator. When this is taken into account, the pore size and the porosity of the organic/inorganic composite porous layer of the present disclosure preferably ranges from 10 nm to 500 nm, from 10 nm to 300 nm, or from 10 nm to 200 nm, and from 30% to 70%, respectively.

According to a particular embodiment of the present disclosure, a mix ratio of the organic substance and the inorganic substance in the organic/inorganic composite porous layer is 1-7 parts by weight of the organic substance relative to 100 parts by weight of the inorganic substance. In the present disclosure, the organic substance is an organic substance included in the composite porous layer, and refers collectively to the binder polymer particles and the adsorbent polymer binder as described below. Furthermore, the inorganic substance is an inorganic substance included in the porous layer, and includes the inorganic particles. When the content of the organic substance in the composite porous layer is less than 1 part by weight, it is difficult to ensure adhesion of the composite porous layer and achieve a desired level of heat resistance, while when the content of the organic substance is too much, it is difficult to reach a desired air transmission time due to the increased resistance by the binder substance.

According to a particular embodiment of the present disclosure, the binder polymer particles have adhesive properties to provide the bond between the porous substrate and the organic/inorganic composite porous layer, and act as a binder to prevent the inorganic particles and/or the binder polymer particles from being detached from the organic/inorganic composite porous layer.

According to a particular embodiment of the present disclosure, the binder polymer particles may be formed by an emulsion polymerization method of polymer. However, the present disclosure is not particularly limited thereto.

The emulsion polymerization method is a method for polymerization of monomer, initiator and emulsifier in an aqueous solvent, for example, water, and is not limited to any particular type if it is a method for preparing polymer particles intended by the present disclosure. For example, a predetermined amount of emulsifier is mixed with a solvent and stirred, the temperature is increased, and monomers are fed. Subsequently, initiator is fed to induce polymerization of the monomers. The result is left alone for a few minutes to a few hours, yielding polymerized polymer particles.

In the present disclosure, the particles may have a spherical or quasi-spherical shape, in which the quasi-spherical shape has a 3-dimensional volume including an oval shape, and the particles include particles of all shapes including amorphous particles having no determinate form. If the binder polymer particles has a shape with a sphericity of close to 1, it will be advantageous in building the pores of the composite porous layer.

In a particular embodiment of the present disclosure, the polymer particles have adhesive properties, and is at least one selected from the group consisting of polyethylene-based polymer particles, polypropylene-based polymer particles, polyvinylidene fluoride-based polymer particles, polyvinylidenefluoride-hexafluoropropylene-based polymer particles, polystyrene-based polymer particles, polyacrylic polymer particles, and copolymers thereof.

In a particular embodiment of the present disclosure, the polymer particles are (meth)acrylate-based polymer particles. To prepare the (meth)acrylate-based polymer particles, the monomers are preferably (meth)acrylic acid ester monomers having C1-C14 alkyl groups. Furthermore, at least one type of monomers selected from the group consisting of allyl ester, vinyl ester, unsaturated ester groups or their mixtures, monomers having cyano groups, monomers having amine groups and styrene-based monomers having vinyl groups may be further included. Furthermore, in the present disclosure, monomers having carboxyl groups and/or hydroxyl groups may be further included.

Furthermore, in the present disclosure, the type or amount of the emulsifier and/or the initiator may be appropriately selected based on the type of the monomers used and desired size and/or adhesive properties of the binder polymer particles. For example, the emulsifier is not limited to a particular type, but may include two or more selected from the group consisting of sodium polyoxyethylene lauryl ether sulfate, sodium lauryl sulfate, sodium alkyl diphenyloxide disulfonate, and sodium dioctyl sulfosuccinate.

According to a particular embodiment of the present disclosure, the size of the binder polymer particles is larger than the pore size of the porous substrate. Alternatively, an average particle size of the binder polymer particles is larger than an average pore diameter of the porous substrate. Alternatively, an average particle size of the binder polymer particles is from 50 nm to 1,000 nm, from 100 nm to 800 nm, from 100 nm to 600 nm, or from 100 nm to 500 nm.

Conventionally, in forming a composite porous layer, a solvent-type binder solution containing polymer resin for binder in an organic solvent was used. The solvent-type binder solution shows good adhesive properties, but when applied to a porous substrate, the solvent-type binder solution penetrates into the pores of the porous substrate, resulting in reduced porosity of the separator.

The present disclosure aims to solve the problem, and as polymer particles having a particle size that is larger than the pore size of the porous substrate are used as a binder, the problem with blocked pores of the porous substrate is not raised, and accordingly, the composite porous layer formed on the surface of the porous substrate has an advantage; an air permeability increase rate of the porous substrate is low.

Figure 3:
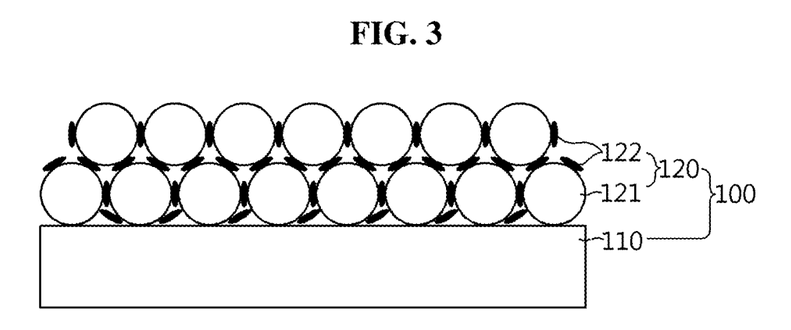
FIG. 3 shows diagrammatically and schematically the cross section of a separator for a secondary battery according to an embodiment of the present disclosure.

FIG. 3 shows diagrammatically and schematically the cross section of the separator according to the present disclosure. As shown, because the present disclosure does not use a solvent-type binder solution and uses organic polymer particles as a binder, the particles do not penetrate into the pores of the porous substrate and do not affect the porosity of the porous substrate, and as the entire amount of organic polymer particles inputted are distributed in in the composite porous layer in mixed state with the inorganic particles, there is an effect in increasing the bond between the inorganic particles as compared to a solvent-type binder.

According to a particular embodiment of the present disclosure, the inorganic particles are not particularly limited so long as they are electrochemically stable. That is, the inorganic particles are not particularly limited if they do not cause any oxidation and/or reduction reaction in the operating voltage range (for example, 0~5V for Li/Li+) of an electrochemical device used. Particularly, the use of inorganic particles having the ability to transport lithium ions increases ionic conductivity in electrochemical devices, contributing to the performance improvement. Furthermore, the use of inorganic particles having a high dielectric constant contributes to the increase in dissolution rate of electrolyte salts, for example, lithium salts, in a liquid electrolyte, thereby increasing ionic conductivity of an electrolyte solution.

By the foregoing reasons, the inorganic particles may include high dielectric constant inorganic particles having a dielectric constant of 5 or higher or a dielectric constant of 10 or higher, inorganic particles having the ability to transport lithium ions or their mixtures. Non-limiting examples of the inorganic particles having a dielectric constant of 5 or higher include $BaTiO_3$, $Pb(Zr,Ti)O_3$ (PZT), $Pb_{1-x}La_xZr_{1-y}Ti_yO_3$ (PLZT, here, 0<x<1, 0<y<1), $Pb(Mg_{1/3}Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $SiC$, and $TiO_2$, singly or in combination. Particularly, inorganic particles such as $BaTiO_3$, $Pb(Zr,Ti)O_3$ (PZT), $Pb_{1-x}La_xZr_{1-y}Ti_yO_3$ (PLZT, here, 0<x<1, 0<y<1), $Pb(Mg_{1/3}Nb_{2/3})O_3$—$PbTiO_3$ (PMN-PT), and hafnia ($HfO_2$) exhibit high dielectric properties of a dielectric constant of 100 or higher, as well as piezoelectricity that is the appearance of a potential difference across two surfaces due to electric charge generated when stretched or compressed by the application of predetermined pressure, thereby preventing the occurrence of an internal short circuit between two electrodes, negative and positive electrodes, caused by external impacts, contributing to the improvement of safety of electrochemical devices. Furthermore, when the high dielectric constant inorganic particles and the inorganic particles having the ability to transport lithium ions are used in combination, their synergistic effect can be greatly magnified.

In the present disclosure, the inorganic particles having the ability to transport lithium ions refers to inorganic particles which contain lithium atoms but do not store lithium, and have a function to move lithium ions, and because the inorganic particles having the ability to transport lithium ions can transfer and move lithium ions due to a kind of defect present in the particle structure, it is possible to improve lithium ionic conductivity in the battery, contributing to the improvement of the battery performance. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), ($LiAlTiP)_xO_y$ based glass ($0<x<4$, $0<y<13$) such as $14Li_2O\text{-}9Al_2O_3\text{-}38TiO_2\text{-}39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ based glass ($Li_xSi_yS_z$, $0<x<3$, $0<y<2$, $0<z<4$) such as $Li_3PO_4$—$Li_2S$—$SiS_2$, $P_2S_5$ based glass ($Li_xP_yS_z$, $0<x<3$, $0<y<3$, $0<z<7$) such as $LiI$—$Li_2S$—$P_2S_5$, or their mixtures.

In the separator according to an embodiment of the present disclosure, there is no limitation on the inorganic particle size of the organic/inorganic composite porous layer, but for a porous layer formed at uniform thickness and optimal porosity, the inorganic particle size may range from 200 nm to 700 nm. The inorganic particle size that satisfies the range maintains dispersion, making it easy to control the properties of the separator, avoids thickness increases of the organic/inorganic composite porous layer, leading to improved mechanical properties, and reduces the probability that an internal short circuit will occur during charging or discharging of the battery due to too large pore size.

In an embodiment of the present disclosure, the composite porous layer may include inorganic particles surface-coated with an adsorbent polymer binder in part or in whole.

The adsorbent polymer binder is a polymer of an adhesive substance, and dissimilar to the binder polymer particles that create pores by the interstitial volume between the binder polymer particles and the inorganic particles packed closely together, the adsorbent polymer binder is adsorbed to the surface of the inorganic particles. Through this, the surface of the inorganic material is negatively charged, and it helps to facilitate the dispersion by anion repulsion in the solvent and ensure adhesion during drying. In case that water is used as the solvent, non-limiting examples of the adsorbent polymer binder include sodium carboxymethyl cellulose (Na-CMC), polyvinyl alcohol (PVA), and in case that an organic solvent is used, non-limiting examples of the adsorbent polymer binder include cyanoethyl polyvinyl alcohol and polyvinyl butyral (PVB).

In the present disclosure, the radius of gyration of the adsorbent polymer binder is larger than or equal to $1/100$ and smaller than or equal to $1/4$ of the median diameter (D50) of the inorganic particles. As the radius of gyration of polymer is larger, the molecular weight of polymer is higher and the main chain length of polymer increases, and as the main chain length of polymer is longer, its agglomeration tendency increases. Accordingly, when the adsorbent polymer binder having a large value of radius of gyration is used, the interstitial volume formed by the inorganic particles may be blocked by agglomeration of the adsorbent polymer binder, causing air permeability to reduce. To solve the problem, the radius of gyration of the adsorbent polymer binder is preferably smaller than the diameter of the inorganic particles. On the contrary, when the radius of gyration is much lower than the diameter of the inorganic particles, the adsorbed polymer is not helpful for the dispersion of the inorganic particles, and preferably, the radius of gyration of the adsorbent polymer binder is $1/100$ or more of the median diameter (D50) of the inorganic particles. According to a particular embodiment of the present disclosure, the radius of gyration of the adsorbent polymer binder is $1/4$ or less of the median diameter of the inorganic particles. For example, when the median diameter (D50) of the inorganic particles is 500 nm, the radius of gyration of the adsorbent polymer binder is preferably 5 nm or more and 125 nm or less.

Hereinafter, the present disclosure provides a method for manufacturing the porous separator.

Figure 1:
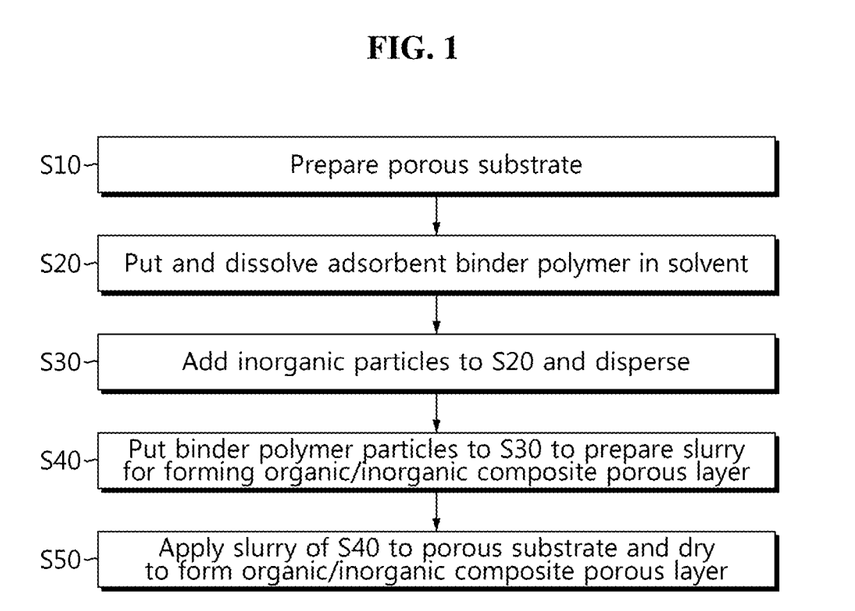
FIG. 1 is a process flowchart showing schematically a sequence of steps of a method for manufacturing a separator for a secondary battery according to the present disclosure.

FIG. 1 is a process flowchart schematically showing a particular embodiment in an order, in the method for manufacturing a porous separator according to the present disclosure.

Referring to FIG. 1, the separator of the present disclosure is formed by preparing a suitable solvent, dissolving an adsorbent polymer binder, putting inorganic particles in a solution containing the dissolved adsorbent polymer binder, fully mixing and dispersing them, putting binder polymer particles to prepare a slurry for a porous coating layer, and applying the prepared slurry to a porous substrate and drying.

In a particular embodiment of the present disclosure, the solvent in which the binder polymer particles does not dissolve is desirable. According to a particular embodiment of the present disclosure, the solvent is, for example, water.

In a particular embodiment of the present disclosure, the slurry may be prepared by putting inorganic particles and adsorbent polymer binder in an emulsion of binder polymer particles dispersed in water, without preparing a separate solvent.

In the present disclosure, a method for coating the slurry on the porous substrate includes common coating methods known in the art, for example, die coating, roll coating, and dip coating.

The porous separator may be manufactured through the above method, but the above method is a particular embodiment for manufacturing the porous separator of the present disclosure, and the manufacturing method is not limited to a particular type if it produces a porous separator having the above properties.

Furthermore, the present disclosure provides an electrochemical device including the porous separator. The electrochemical device is, more particularly, a secondary battery, preferably a lithium secondary battery with high energy density, discharge voltage, and output safety, and most preferably a lithium ion secondary battery that has a low probability of leakage of an electrolyte solution and low weight and production costs, and is easy to fabricate in various shapes.

The lithium ion secondary battery according to the present disclosure includes a positive electrode, a negative electrode, a separator and an electrolyte solution, and the separator is defined in the foregoing.

In a particular embodiment of the present disclosure, the positive electrode is made by, for example, applying a positive electrode active material to a positive electrode current collector and drying, and a binder and a conductive material, and if necessary, substances described in relation to the elements of the positive electrode may be further included.

The positive electrode current collector is generally made with a thickness of between 3 and 500 μm. The positive electrode current collector is not limited to any particular type if it has high conductivity while not causing a chemical change to the corresponding battery, and for example, may include stainless steel, aluminum, nickel, titanium, baked carbon, or aluminum or stainless steel surface treated with carbon, nickel, titanium, and silver. Furthermore, the positive electrode current collector may have small-scale texture on the surface to increase the adhesion of the positive electrode active material, and may come in various types including films, sheets, foils, nets, porous materials, foams, and nonwovens.

The positive electrode active material includes, but is not limited to, layered compounds such as lithium cobalt oxide ($LiCoO_2$) and lithium nickel oxide ($LiNiO_2$) or compounds with one or more transition metal substitution; lithium manganese oxide of chemical formula $Li_{1+x}Mn_{2-x}O_4$ (here, x is 0~0.33), $LiMnO_3$, $LiMn_2O_3$, $LiMnO_2$; lithium copper oxide ($Li_2CuO_2$); vanadium oxide such as $LiV_3O_8$, $LiFe_3O_4$, $V_2O_5$, $Cu_2V_2O_7$; Ni site type lithium nickel oxide represented by chemical formula $LiNi_{1-x}M_xO_2$ (here, M=Co, Mn, Al, Cu, Fe, Mg, B or Ga, x=0.01~0.3); lithium manganese composite oxide represented by chemical formula $LiMn_{2-x}M_xO_2$ (here, M=Co, Ni, Fe, Cr, Zn or Ta, x=0.01~0.1) or $Li_2Mn_3MO_8$ (here, M=Fe, Co, Ni, Cu or Zn); $LiMn_2O_4$ with partial substitution of alkali earth metal ion for Li in chemical formula; disulfide compounds; and $Fe_e(MoO_4)_3$.

The negative electrode may be made by applying a negative electrode material including a negative electrode active material and a binder to a current collector, followed by drying and compression, and optionally, substances such as a conductive material and a filler may be further included if necessary.

The negative electrode material includes, for example, carbon such as non-graphitizable carbon and graphite-based carbon; metal composite oxide such as $Li_xFe_2O_3$ ($0 \leq x \leq 1$), $Li_xWO_2$ ($0 \leq x \leq 1$), and $Sn_xMe_{1-x}Me'_yO_z$ (Me: Mn, Fe, Pb, Ge; Me': Al, B, P, Si, elements of Group 1, 2 and 3 in the periodic table, halogen; $0 < x \leq 1$; $1 \leq y \leq 3$; $1 \leq z \leq 8$); lithium metal; lithium alloys; silicon-based alloys; tin-based alloys; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymer such as polyacetylene; and Li—Co—Ni based materials.

The electrolyte solution is a lithium salt containing non-aqueous electrolyte, and includes an organic solvent and a lithium salt. The organic solvent includes, for example, aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydroxy franc, 2-methyl tetrahydrofuran, dimethylsulfoxide, 1,3-dioxolane, 4-methyl-1,3-dioxane, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

The lithium salt is a material that is apt to dissolve in the nonaqueous electrolyte, and includes, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, chloroborane lithium, lithium lower aliphatic carboxylate, lithium tetraphenylborate, and imide.

Furthermore, to improve the charging/discharging characteristics and flame retardancy, for example, pyridine, triethylphosphite, triethanolamine, cyclic ether, ethylene diamine, n-glyme, triamide hexaphosphate, nitrobenzene derivatives, sulfur, quinone imine dye, N-substituted oxazolidinone, N,N-substituted imidazolidine, ethylene glycol dialkyl ether, ammonium salts, pyrrole, 2-methoxy ethanol, and aluminum trichloride may be added to the electrolyte solution. In some cases, to give non-combustibility, a halogen containing solvent such as carbon tetrachloride and trifluoroethylene may be further included, and to improve high temperature maintenance, carbon dioxide gas may be further included.

Although not stated herein, battery elements commonly used in the field of secondary batteries may be included.

Hereinafter, the present disclosure will be described in detail through embodiments. The embodiments of the present disclosure, however, may be modified in many other forms, and the scope of the present disclosure is not limited to the following embodiments.

Example 1

$Al_2O_3$ (Nippon light metal, LS235, particle size 510 nm), waterborne acrylic emulsion (Toyo ink, CSB130, solids 40%, particle size 177 nm), and carboxymethylcellulose (GL Chem, SG-L02, radius of gyration 25 nm) were put in water at a ratio of 98:1:1 and stirred to obtain a uniform dispersion slurry. The slurry was applied to one surface of a polyethylene porous substrate (W scope, WL11B, air transmission time 150 sec/100 cc) using a doctor blade and dried with cool air to manufacture a porous separator having an organic/inorganic composite porous layer. The air transmission time of the manufactured separator was at the level of 153 sec/100 cc that was almost unchanged when compared to the air transmission time of the polymer substrate before formation of the organic/inorganic composite porous layer.

Example 2

Except that $Al_2O_3$ was replaced with AlOOH (Nabaltec, Actilox200SM, particle size 230 nm), and a mix ratio of a slurry was adjusted such that a ratio of inorganic particles:organic particles:thickener was 94:3:3 on the basis of a weight ratio, a porous separator was manufactured in the same way as example 1. The air transmission time of the manufactured separator was at the level of 163 sec/100 cc that was almost unchanged when compared to the air transmission time of the polymer substrate before formation of the organic/inorganic composite porous layer.

Comparative Example 1

5 parts by weight of PVdF-CTFE (polyvinylidenefluoride-chlorotrifluoroethylene copolymer) was added to 95 parts by weight of acetone, and dissolved at 50° C. for about 12 hours or longer to prepare a binder solution. The same alumina particles as example 1 were mixed with the binder solution such that a ratio of binder:alumina particles is 10:90 on the basis of a weight ratio, and dispersed to prepare a slurry for a composite porous layer. The prepared slurry was applied in the same way as example 1. The air transmission time of the manufactured separator was greatly increased to the level of 235 sec/100 cc.

Comparative Example 2

Figure 5:
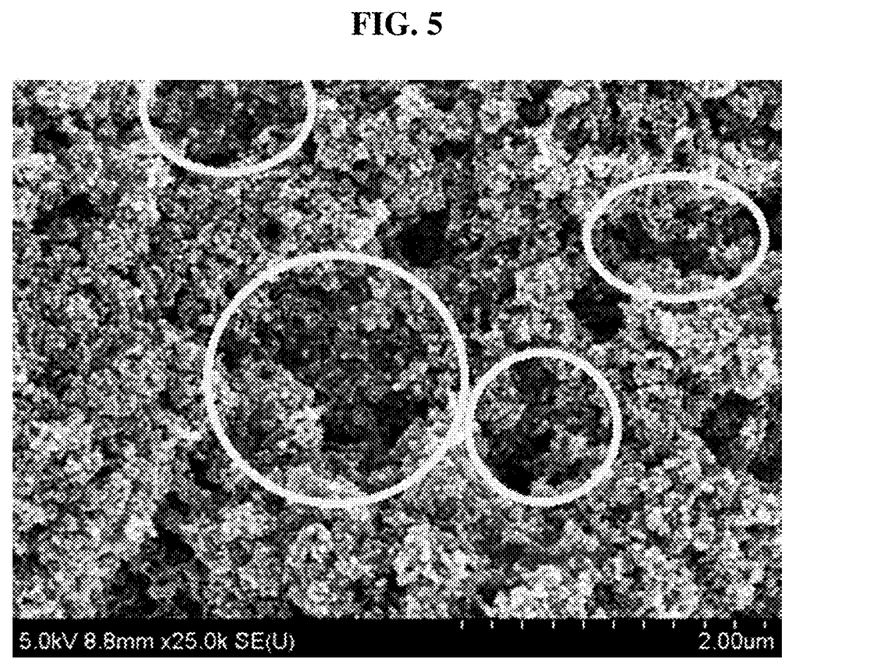
FIG. 5 a scanning electron microscope (SEM) image showing the surface of an organic/inorganic composite porous layer of a separator manufactured in comparative example 2.

$Al_2O_3$ (Cabot, FA51, particle size 50 nm), waterborne acrylic emulsion (Toyo ink, CSB130, solids 40%, particle size 177 nm), and carboxymethylcellulose (Dai-ichi kogyo seiyaku Co., Ltd., 3H, radius of gyration 100 nm) were put in water at a ratio of 94:3:3 and stirred to obtain a uniform dispersion slurry. The slurry was applied to one surface of a polyethylene porous substrate (W scope, WL11B, air transmission time 150 sec/100 cc) using a doctor blade and dried with cool air to manufacture a porous separator having an organic/inorganic composite porous layer. The air transmission time of the manufactured separator was at the level of 269 sec/100 cc that was dramatically increased when compared to the air transmission time of the polymer substrate before formation of the organic/inorganic composite porous layer. FIG. 5 is a SEM image showing the surface of the separator manufactured in comparative example 2. As shown, it was seen that pores were blocked due to the use of carboxy methyl cellulose whose the radius of gyration is large on the surface of the organic/inorganic composite porous layer. The blocked pores were indicated by a circle (dotted line) in the drawing.

DESCRIPTION OF REFERENCE NUMERALS

100: Separator
110: Porous substrate
120: Organic/inorganic composite porous layer
121: Inorganic particle
122: Binder polymer particle

What is claimed is:

1. A porous separator for a secondary battery, comprising:
a polymer porous substrate having pores; and
an organic/inorganic composite porous layer formed on at least one surface of the polymer porous substrate,
wherein the organic/inorganic composite porous layer consists of inorganic particles, binder polymer particles, and an adsorbent polymer binder, and the inorganic particles are coated with the adsorbent polymer binder on at least a portion of surface,
wherein a maximum radius of gyration of the adsorbent polymer binder is $1/100$ or more and $1/4$ or less of a median diameter (D50) of the inorganic particles,
wherein the maximum radius of gyration of the adsorbent polymer binder is 5 nm or more and 25 nm or less,
wherein an average particle size of the inorganic particles is a minimum of 20 nm,
wherein an average particle size of the inorganic particles and the binder polymer particles is larger than a median diameter of the pores of the porous substrate,
wherein the binder polymer particles are polyacrylic polymer particles,
wherein the adsorbent polymer binder is carboxymethyl cellulose, polyvinyl alcohol (PVA), cyanoethyl polyvinyl alcohol, polyvinyl butyral (PVB) or combination thereof, and
wherein the adsorbent polymer binder is adsorbed to the surface of the inorganic particles.

2. The porous separator for a secondary battery according to claim 1, wherein the inorganic particles and the binder polymer particles are uniformly dispersed and distributed in the organic/inorganic composite porous layer, and the organic/inorganic composite porous layer is a porous structure having pores formed by interstitial volume between the inorganic particles and/or binder polymer particles.

3. The porous separator for a secondary battery according to claim 1, wherein an average particle size of the binder polymer particles is a minimum of 20 nm.

4. The porous separator for a secondary battery according to claim 1, wherein the binder polymer particles are formed by emulsion polymerization.

5. The porous separator for a secondary battery according to claim 1, wherein the inorganic particles are not oxidized and/or reduced within an operating voltage range of the secondary battery.

6. The porous separator for a secondary battery according to claim 1, wherein the inorganic particles are inorganic particles having an ability to transport lithium ions and/or high dielectric constant inorganic particles having a dielectric constant of 5 or higher.

7. A secondary battery comprising a negative electrode, a positive electrode, a separator interposed between the negative electrode and the positive electrode, and an electrolyte solution,
wherein the separator comprises:
a polymer porous substrate having pores; and
an organic/inorganic composite porous layer formed on at least one surface of the polymer porous substrate,
wherein the organic/inorganic composite porous layer consists of inorganic particles, binder polymer particles, and an adsorbent polymer binder, and the inorganic particles are coated with the adsorbent polymer binder on at least a portion of surface,
wherein a maximum radius of gyration of the adsorbent polymer binder is $1/100$ or more and $1/4$ or less of a median diameter (D50) of the inorganic particles,
wherein the maximum radius of gyration of the adsorbent polymer binder is 5 nm or more and 25 nm or less,
wherein an average particle size of the inorganic particles is a minimum of 20 nm,
wherein an average particle size of the inorganic particles and the binder polymer particles is larger than a median diameter of the pores of the porous substrate,
wherein the binder polymer particles are polyacrylic polymer particles,
wherein the adsorbent polymer binder is carboxymethyl cellulose, polyvinyl alcohol (PVA), cyanoethyl polyvinyl alcohol, polyvinyl butyral (PVB) or combination thereof, and
wherein the adsorbent polymer binder is adsorbed to the surface of the inorganic particles.

8. The secondary battery according to claim 7, wherein the inorganic particles and the binder polymer particles are uniformly dispersed and distributed in the organic/inorganic composite porous layer, and the organic/inorganic composite porous layer is a porous structure having pores formed by interstitial volume between the inorganic particles and/or binder polymer particles.

9. A method for manufacturing a porous separator for a secondary battery, comprising:
(S10) preparing a polymer porous substrate having pores;
(S20) putting and dissolving an adsorbent polymer binder in a solvent;
(S30) adding inorganic particles to the result of (S20) and dispersing the same;
(S40) putting binder polymer particles in the result of (S30) to prepare a slurry for forming an organic/inorganic composite porous layer; and
(S50) applying the slurry of (S40) to the porous substrate prepared at (S10) and drying,
wherein the organic/inorganic composite porous layer formed at (S50) consists of the inorganic particles, the binder polymer particles, and the adsorbent polymer binder, and the inorganic particles and the binder polymer particles are uniformly dispersed and distributed in the organic/inorganic composite porous layer, and the organic/inorganic composite porous layer is a porous structure having pores formed by interstitial volume between the inorganic particles and/or binder polymer particles,
wherein a maximum radius of gyration of the adsorbent polymer binder is $1/100$ or more and $1/4$ or less of a median diameter (D50) of the inorganic particles, and wherein the maximum radius of gyration of the adsorbent polymer binder is 5 nm or more and 25 nm or less, wherein an average particle size of the inorganic particles is a minimum of 20 nm, wherein an average particle size of the inorganic particles and the binder polymer particles is larger than a median diameter of the pores of the porous substrate, wherein the binder polymer particles are polyacrylic polymer particles, wherein the adsorbent polymer binder is carboxymethyl cellulose, polyvinyl alcohol (PVA), cyanoethyl polyvinyl alcohol, polyvinyl butyral (PVB) or combination thereof, and wherein the adsorbent polymer binder is adsorbed to the surface of the inorganic particles.

* * * * *